R. W. WHEELER.
Machine for Cutting Spherical Bodies.

No. 203,515.     Patented May 7, 1878.

Witnesses
William H. Knight.
William A. Thompson.

Inventor
Richmond W. Wheeler

UNITED STATES PATENT OFFICE.

RICHMOND W. WHEELER, OF BUSHNELL, ILLINOIS.

IMPROVEMENT IN MACHINES FOR CUTTING SPHERICAL BODIES.

Specification forming part of Letters Patent No. 203,515, dated May 7, 1878; application filed February 11, 1878.

*To all whom it may concern:*

Be it known that I, RICHMOND W. WHEELER, of the city of Bushnell, in the county of McDonough and State of Illinois, have invented a new and useful improvement in machines for sawing or making globes or globular forms, including croquet-balls, billiard-balls, and similar articles of manufacture, which improvement is fully set forth in the following specification, reference being had to the accompanying drawings.

My invention pertains to that class of articles denominated in a general way "machines for sawing or making globes or globular forms," including croquet-balls, billiard-balls, and similar articles of manufacture. This machine incorporates in its construction a heavy frame, which supports the moving and operating parts that accomplish the work and object desired. On this main supporting-frame is bolted a shaft, revolving in proper boxes. On this shaft is secured a series of circular saws, with their sides in contact one with another. This series of saws is arranged with the two outside saws of the series larger than any other two saws in the series. The saws grow uniformly smaller from these two outside saws toward the center of the series, so that the line of the face of these saws is a concaved semicircle. The result of this construction is, that when these saws are run against an article to be sawed, they will saw a convex face on the article, the convexity reaching over the distance of about a half a sphere.

To a part of the main supporting-frame of this machine is pivoted a movable frame, in which are secured a fixed shaft and an adjustable shaft. These shafts each have a three-cornered cavity in their adjacent ends. In these three-cornered cavities can be placed a block, of any material, in the form of a cube, two corners of the cube going into the right-angled three-cornered cavities in the ends of these shafts. These shafts are so arranged that when a block is placed between the two holding ends—that is, the ends containing the three-cornered right-angled cavities—the block will rest in front of the concaved semicircular-faced series of saws, so that when the series of saws is revolving the frame that holds the block of wood to be sawed can be vibrated or oscillated toward or from the saws, and brought up toward the saws until the block of wood is sawed into a semicircular convex shape on the side next to the face of the saws; but while this is being done the block is also made to revolve in the same line with the revolution of the saws. This is accomplished by revolving one of the shafts that holds the block of wood, so that when the saws are revolving rapidly, and the block of wood has made one or more revolutions in front of the face of the saws, it is sawed into almost a globular form, as will be explained farther on. When this operation is completed the block of wood, or other material that is being sawed into the shape of a globe, will be ridged where the saw-teeth cut it.

The frame that supports the shafts that hold this block of wood is then oscillated back from the face of the saws toward and against a saw whose face is a circle, the teeth being cut on one end of a hollow cylinder. This last-mentioned saw is made to revolve in a direction at right angles to that of the revolution of the globe that is being sawed, the globe at the same time being revolved and oscillated against the face of this hollow cylinder saw. The result of this is to cut and shave off the irregularities left on the globe by the hemispherical-shaped faced series of saws, and leave the ball perfectly smooth and spherical.

To describe my machine more accurately and intelligibly, I will now refer to the drawings and the different parts of the machine therein delineated, calling attention to the different parts by means of the letters indicating those parts in the drawings, which letters agree with the letters used in this specification when mentioning the same parts.

In the drawings, Figure 1 is a top and diagonal view of my machine. In this Fig. 1, A is the main supporting-frame of the machine. B is the top timber of this supporting-frame. Onto this timber B is secured, by means of the boxes C, the shaft D, which supports the series of saws F, with their concave semicircular face. This series of saws F is made to revolve by means of the power applied to the pulley E.

X is an oscillating or vibrating frame, oscillating or vibrating on the pivot-rod c, by which means the top of the frame may be made to move from the series of saws F back toward the hollow cylinder saw G, and vice versa, at pleasure. In the top of this frame X is a shaft, R, one of whose ends contains a right-angled three-cornered cavity, S. (Seen more fully in Fig. 2.) Into this cavity S one corner of the cube block to be manipulated is placed. The opposite corner of the block to be manipulated is placed in a like cavity, which is pivoted onto the shaft P, so that this concaved holding end that is pivoted on P may turn with the ball N and shaft R without the shaft P being turned. The shaft P is adjustable longitudinally by means of a screw-thread cut on the same, by which means the ball N may be tightly secured between the ends of the shafts R and P, and also readily released therefrom at pleasure.

The shaft R is made to revolve, when desired, by means of the pulley-wheel T and belt, or other means of conveying power, U; V being the pulley-wheel that supplies the power to the belt U, the pulley V being rigid on the same shaft with W, and the power being applied to the wheel W. The frame X is oscillated and regulated by means of the screw-shaft a and crank b.

The screw on the shaft a works in a female screw in the shaft d, which shaft d is pivoted by means of the rod f, so that when the shaft a is screwed forward through the shaft d it carries backward away from the face of the series of saws the top of the frame X, carrying the ball N toward and against the hollow cylinder saw G. The shaft a is pivoted at one end to the frame X by a swivel-joint.

The shaft H, which supports the hollow cylinder saw G, is made to revolve, when desired, by means of the pulley J. This shaft H is secured, by means of the boxes K, to the cross-pieces L of the frame A. The screw k secures the shaft P in whatever position it is desired to be set.

Figure 3:
Fig. 3 shows the position of the block when first placed in the machine ready to be sawed in shape.
Figure 4:
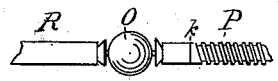
Figure 1:
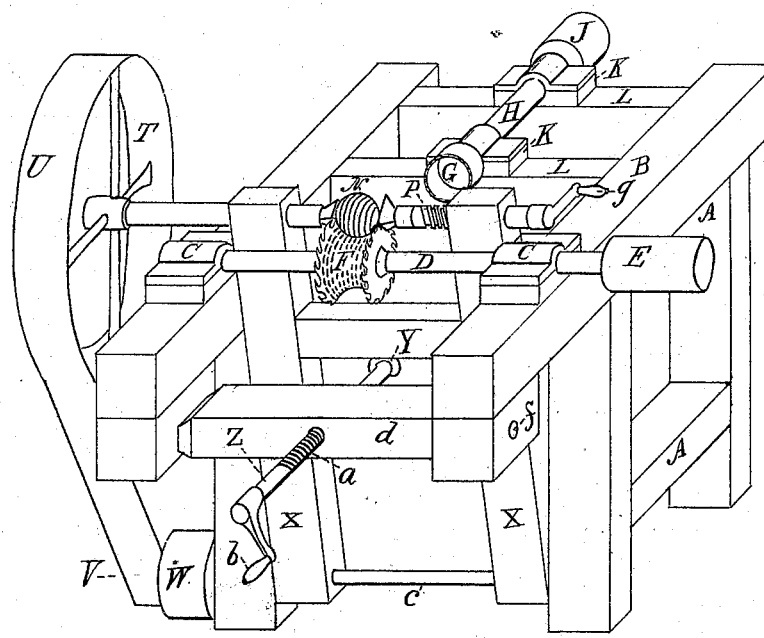
Figure 2:
Fig. 2 is a transverse section on the shaft R or P, showing the right-angled three-cornered concavity in the end of either of these shafts, which concavity holds the cube block M, Fig. 3, in position when being sawed into a globe or sphere, N, Fig. 1.

Fig. 4 shows the block when completed into a sphere, all excepting attenuated poles that connect the sphere with the two retaining-corners that rest in the cavities S. M shows the block in a cube form before being sawed. N shows the block after being sawed by the saws F. O shows the sphere after it has been completed by the saw G.

The operation of this machine is as follows: The cube block M is placed with two opposite corners in the cavities S, and adjusted into position by means of the screw P. The series of saws F is then made to revolve by means of the shaft D. The frame X is then made to oscillate by means of the shaft a against the face of the saws F, when the ball is sawed into the shape seen at N. The shaft H, with its saw G, is meanwhile revolving, and the ball N, after having been operated upon by the saws F, is oscillated against and into the saw G by means of the screw-threaded shaft a, by which the ball is finished in the shape seen at O, Fig. 4.

By this machine I am enabled to turn croquet-balls or billiard-balls into the form of a sphere, or almost a sphere, with great rapidity, ease, and perfection.

What I claim as new, as my invention, and desire to secure by Letters Patent, is—

1. The series of saws F, with the face of the series graduated into the semicircular concave form shown.

2. The series of saws F, constructed as described, in combination with the vibrating frame X, having the holding-shafts P R, constructed to hold the tube, as described, as and for the purpose set forth.

3. The series of saws F, constructed as described, in combination with the vibrating frame, arranged to carry the material to be sawed either to the saws F or cylindrical saw G.

4. The shafts R and P, constructed with the three-cornered cavities S, for the purpose set forth.

5. The hollow cylinder saw G, in combination with the vibrating frame X, for the purpose set forth.

6. The hollow cylinder saw G, in combination with the concaved semicircular-faced series of saws F and the frame X, for the purpose set forth.

RICHMOND W. WHEELER.

Witnesses:
JOSEPH B. McCONNELL,
M. MARKHAM.